United States Patent [19]

Schaumburg et al.

[11] Patent Number: 4,515,187

[45] Date of Patent: May 7, 1985

[54] COMPOUND DISPENSING METHOD AND APPARATUS

[75] Inventors: Edward G. Schaumburg, Askov; Eugene F. Stanefski, South St. Paul, both of Minn.

[73] Assignee: GNB Batteries Inc., Mendota Heights, Minn.

[21] Appl. No.: 375,802

[22] Filed: May 7, 1982

[51] Int. Cl.³ .................... B65B 3/06; H01M 7/00
[52] U.S. Cl. .................... 141/1; 118/680; 141/156; 141/165; 141/87; 141/185; 141/269; 29/623.1
[58] Field of Search ........ 141/100, 167, 178, 180–185, 141/188, 192, 231–236, 250, 269, 266, 284, 311, 325, 387, 140, 156, 153, 165, 87, 82, 1, 1.1; 429/139; 250/222, 548, 561; 29/730, 623.1–623.4; 424/254

[56] References Cited

U.S. PATENT DOCUMENTS

| | | | |
|---|---|---|---|
| 1,911,579 | 5/1933 | McNeil | 141/387 X |
| 2,030,084 | 2/1936 | Winton | 141/25 |
| 2,701,592 | 2/1955 | Tench | 118/681 |
| 2,792,855 | 5/1957 | Walts | 141/87 |
| 3,077,857 | 2/1963 | Widner | 118/680 |
| 3,265,100 | 8/1966 | Holm et al. | 141/250 |
| 3,598,160 | 8/1971 | Quinn | 141/156 |
| 3,622,396 | 11/1971 | Fernandez et al. | 29/623.1 |
| 3,934,624 | 1/1976 | Eberle | 141/100 |
| 4,015,560 | 4/1977 | Paul | 141/250 |
| 4,037,030 | 7/1977 | Sabatino | 429/139 |
| 4,142,561 | 3/1979 | Bennett et al. | 141/82 |

FOREIGN PATENT DOCUMENTS 743190 9/1966 Canada .................... 429/139

Primary Examiner—Stephen Marcus
Assistant Examiner—Ernest G. Cusick
Attorney, Agent, or Firm—Augustus J. Hipp; Charles L. Rowe

[57] ABSTRACT

A method and apparatus for providing a compound (22) in each of the cell spaces of a multicell battery case (10). The compound comprises a bituminous material delivered to a plurality of the cell spaces concurrently through a plurality of nozzles (25) of a dispensing head (24). The battery case (10) is accurately positioned against a back stop (45) and a forward stop (36). A sensor (49) determines the accurate alignment of the battery case (10) in the fill position and cooperates with a controller (81) for controlling operation of the automatic dispenser (23). In the dispensing operation, the nozzles (25) are moved along a first plurality of cells. The nozzles are then retracted and moved lengthwise of the case to be aligned with a second group of cells. The nozzles are then moved along the case cells while dispensing compound to the second group of cells. A drip shield (62) is automatically positioned under the nozzles when they are being moved between cells and during movement of the battery case to and from the delivery position. Microswitches (69,70,90,91) are provided for accurately sensing the position of the dispenser head and adjustable control rods (71,72,75,76) are provided for permitting adjustment of the operation of the microswitches to accommodate the dispensing operation to different size battery cases. Structure is provided for maintaining the compound hot prior to its delivery into the battery case. Control of the dispensing operation is coordinated with other process steps in the manufacture of the battery by way of the controller (81).

35 Claims, 8 Drawing Figures

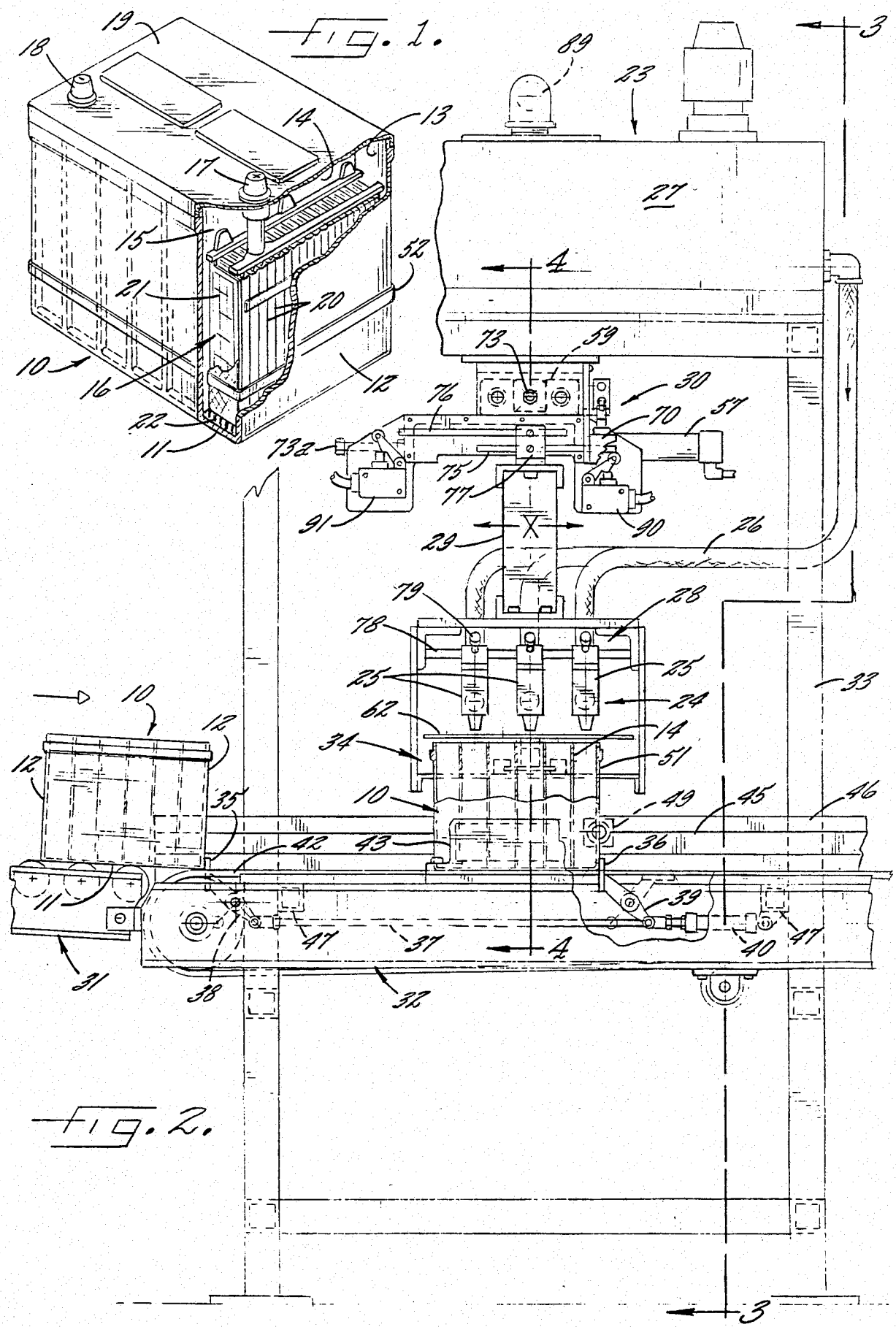

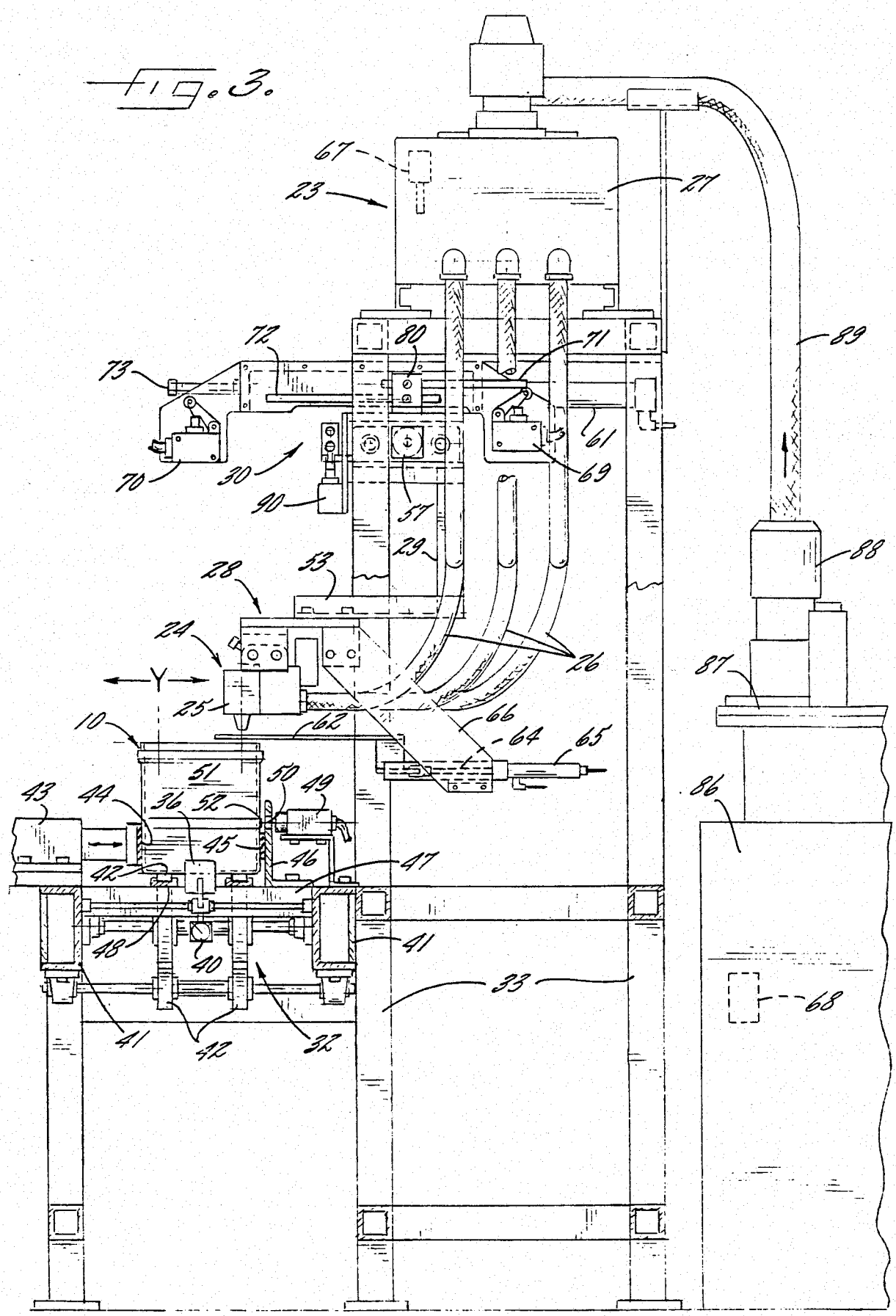

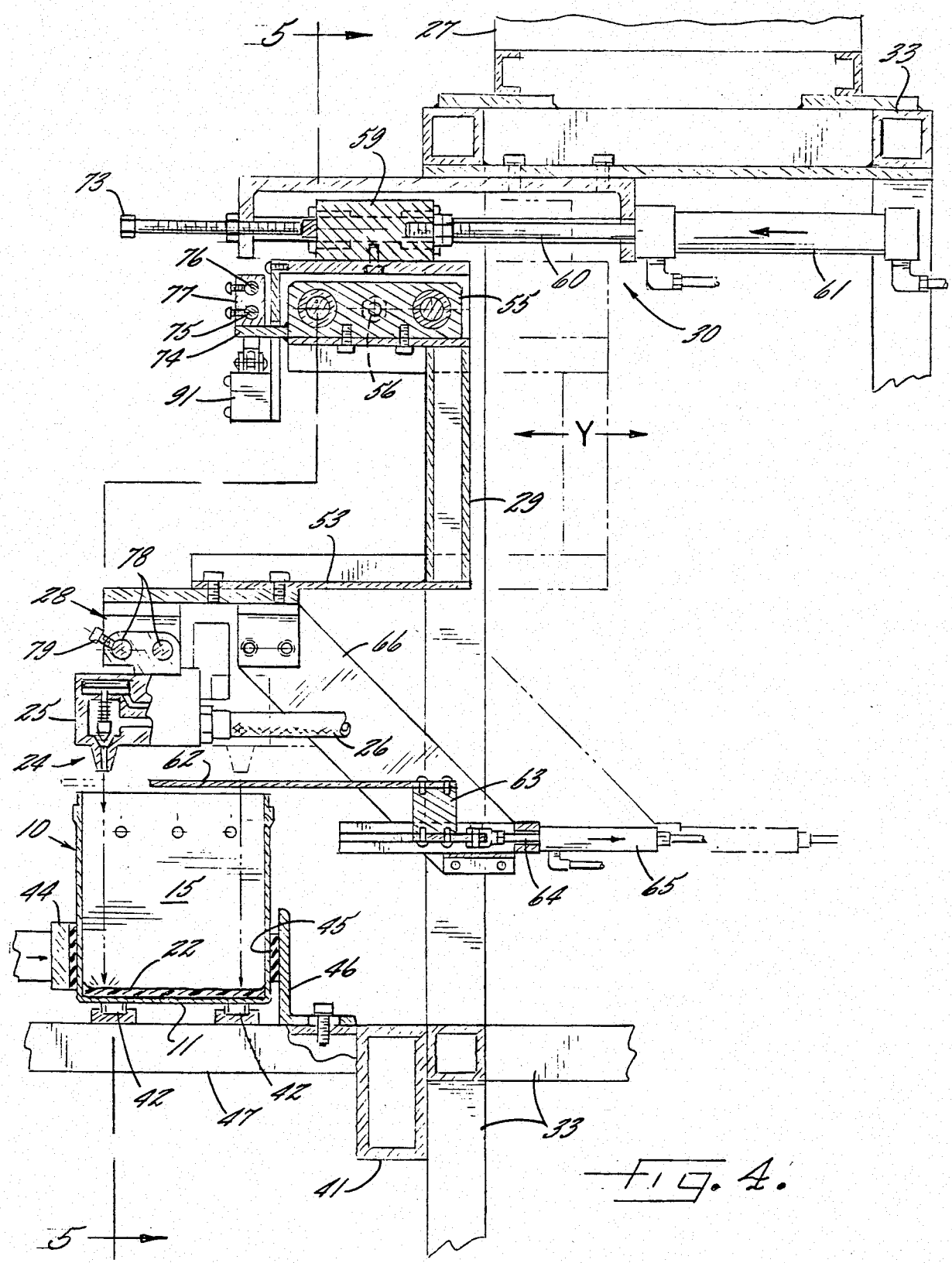

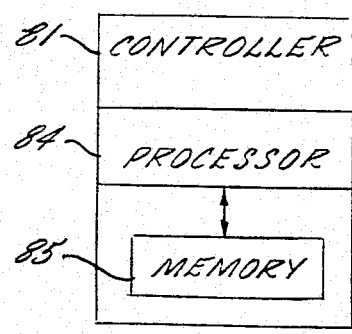
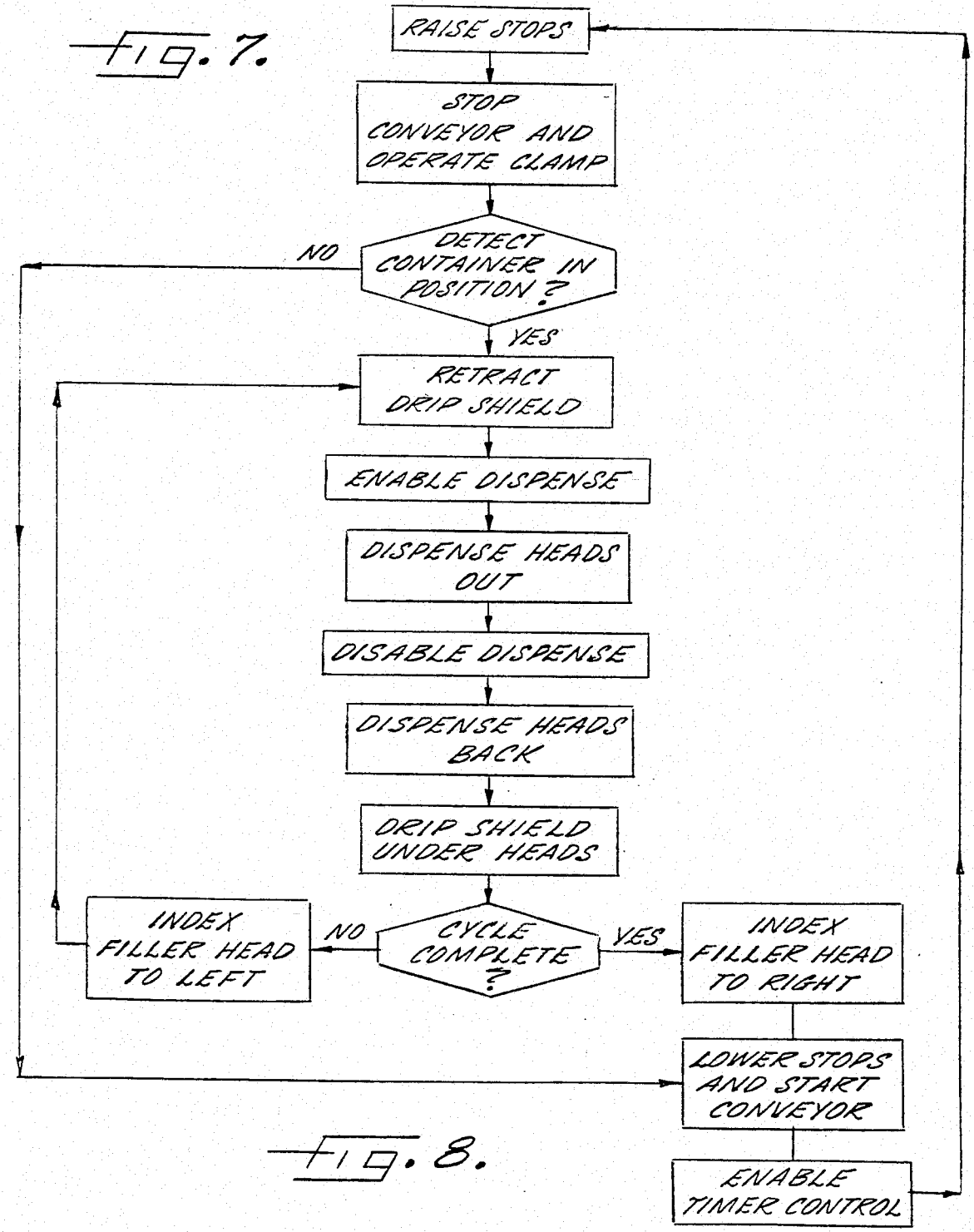
Fig. 7.
Fig. 8.

COMPOUND DISPENSING METHOD AND APPARATUS

DESCRIPTION

1. Technical Field

This invention relates to the dispensing of a compound into a container and more particularly to the dispensing of a liquid compound into an upwardly opening container such as for depositing a body of the compound on the bottom of the container.

2. Background Art

The present invention is concerned, in the illustrative embodiment, with the provision of a filler material on the bottom wall of a battery case or container. The filler material subsequently defines means for insulating, bonding, and sealing the lower portions of cell components of the battery. The container is conventionally provided with a plurality of divider walls so as to effectively define a plurality of side-by-side cell spaces or compartments.

An excellent example of a maintenance-free storage battery wherein bonding material is provided on the bottom wall of the battery container, with the lower edges of the plates extending into the bonding material to provide vibration resistance, as well as the desirable insulative bonding and sealing for preventing treeing of the active material of the cell plates, is disclosed in U.S. Pat. No. 4,037,030 of Anthony Sabatino, which patent is owned by the assignee hereof. As disclosed in the Sabatino patent, the bonding material is provided on the bottom wall of the battery in a liquid state, permitting the lower edges of the plates and separators between the plates to be submerged in the liquid before it sets. The present invention is concerned with an improved method and apparatus for effecting the delivery of the bonding material in such liquid form uniformly to the different cell spaces prior to the insertion of the assembled cell plates and separators.

As indicated, it is desirable to dispense the sealing, bonding and insulating filler material or compound uniformly onto the bottom wall of the container in each of the respective cell spaces. A problem arises in such dispensing in that it is necessary to accurately align the dispensing means with the respective cell spaces and to quickly and accurately fill each of the respective spaces with the desired amount of compound.

Another problem arises in that the compound may be relatively nonviscous or fluid at the dispensing temperature and, thus, tend to drip undesirably on portions of the container, such as during movement of the container into and from the dispensing position subjacent the dispensing means.

It is also desirable to provide a method and apparatus for effecting such compound dispensing which, notwithstanding the fluid nature of the compound, permits high speed filling of the cell spaces so as to coordinate the filling step with other steps in the manufacture of the battery so as to effectively maximize efficiency in the mass production of the batteries.

It is further conventional to provide the containers on suitable conveyors for automatic movement thereof from a supply station into and from the dispensing position adjacent the compound dispensing heads.

It is further desirable in coordination of the dispensing step to utilize control means responsive to inputs from other portions of the battery manufacturing apparatus in carrying out the compound filling steps.

DISCLOSURE OF THE INVENTION

The present invention comprehends an improved method of controlling the dispensing of a compound into a container, such as a battery case.

The invention comprehends such a method of dispensing a compound wherein the disposition of the container is automatically detected and the dispensing operation effected automatically upon such detection.

The invention further comprehends the provision of such a method wherein means are provided for preventing undesirable drip of the compound between container filling steps.

The invention comprehends further effecting the compound dispensing by multiple filling steps with respect to each container where the container is divided into a plurality of separate spaces.

Still further, the invention comprehends the method of accurately locating the container by means of sensing the location of a small portion of the container to provide improved accuracy in locating or positioning the container for effecting the filling steps.

In the illustrated embodiment, the location of the container is determined by electromagnetic radiation arranged to be focused on a preselected portion of the container to indicate the accurate positioning thereof.

The invention comprehends further the positive retention of the container in the filling position as by clamping so as to maintain the container in the accurately determined filling disposition.

In the illustrated embodiment, the means for detecting the position of the container comprises electromagnetic radiation passed through an opening in the clamping means.

In the illustrated embodiment, the provision of the compound is preselected to provide a sealing insulation at the bottom of a folded insulator-battery plate assembly received in each of the respective cell spaces of the battery case.

In the illustrated embodiment, the compound preferably comprises a heated bituminous material.

In the illustrated embodiment, the compound is provided in the respective cell spaces to a depth of approximately $\frac{1}{8}''$ and effectively precludes shorting between adjacent plates of the folded cell arrangement and prevents relative movement of the plates to thereby make the element more vibration resistant.

The method and apparatus for dispensing the compound into the containers of the present invention is extremely simple and economical while yet providing improved automatic and accurate compound dispensing such as for use in an automated battery manufacture.

BRIEF DESCRIPTION OF THE DRAWING

Other features and advantages of the invention will be apparent from the following description taken in connection with the accompanying drawing wherein:

FIG. 1 is a perspective view of a battery into which compound is dispensed by the improved method embodying the invention;

FIG. 2 is a fragmentary front elevation of the dispensing means;

FIG. 3 is a fragmentary transverse section taken substantially along the line 3—3 of FIG. 2;

FIG. 4 is a fragmentary enlarged transverse section taken substantially along line 4—4 of FIG. 2;

FIG. 7 is a simplified block diagram illustrating the coordination of the compound dispensing means with the control means therefor; and FIG. 8 is a block diagram illustrating the steps in carrying out the dispensing operation.

BEST MODE FOR CARRYING OUT THE INVENTION

Figure 5:
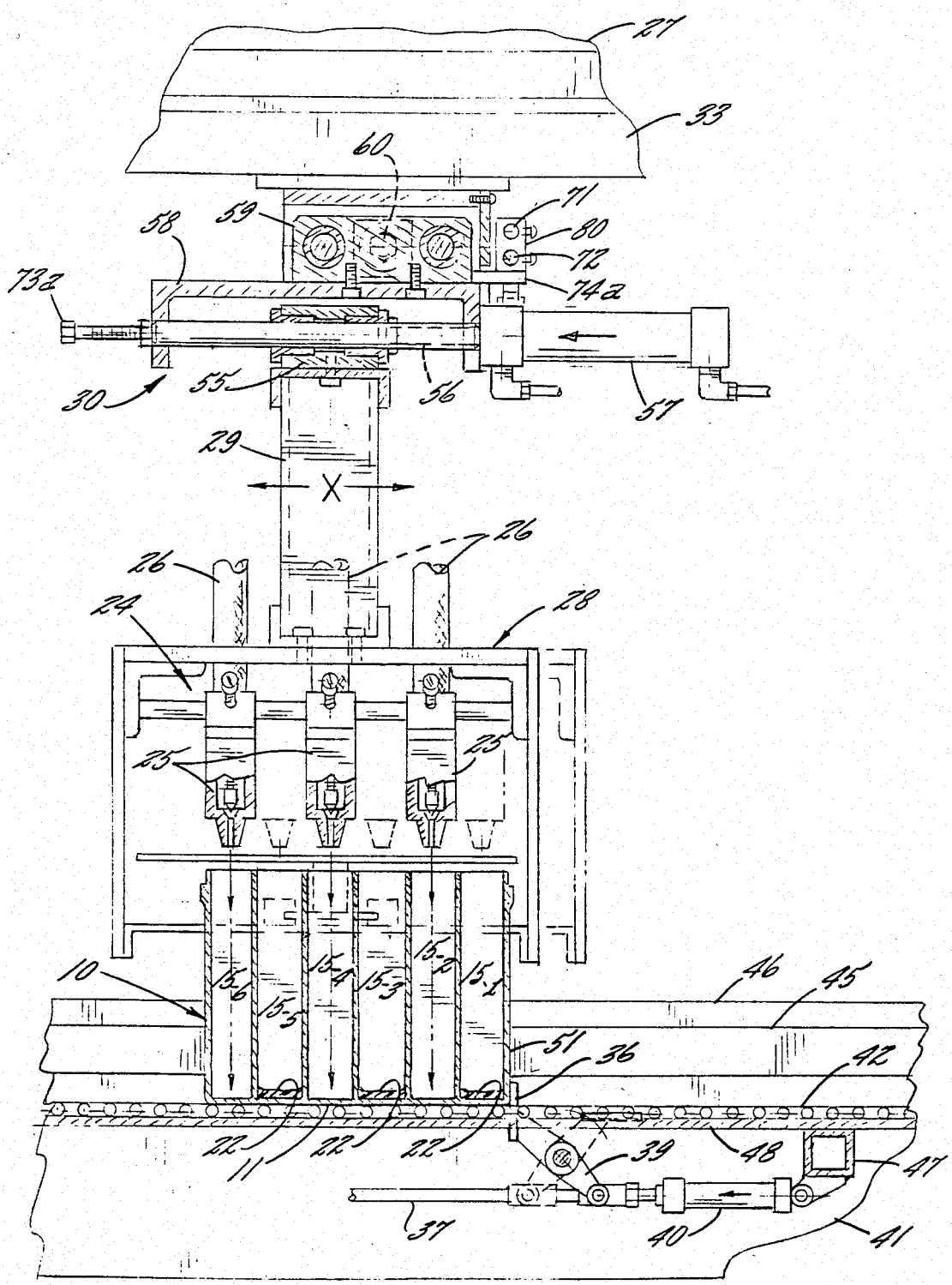
FIG. 5 is a fragmentary section taken substantially along the line 5—5 of FIG. 4.
Figure 6:
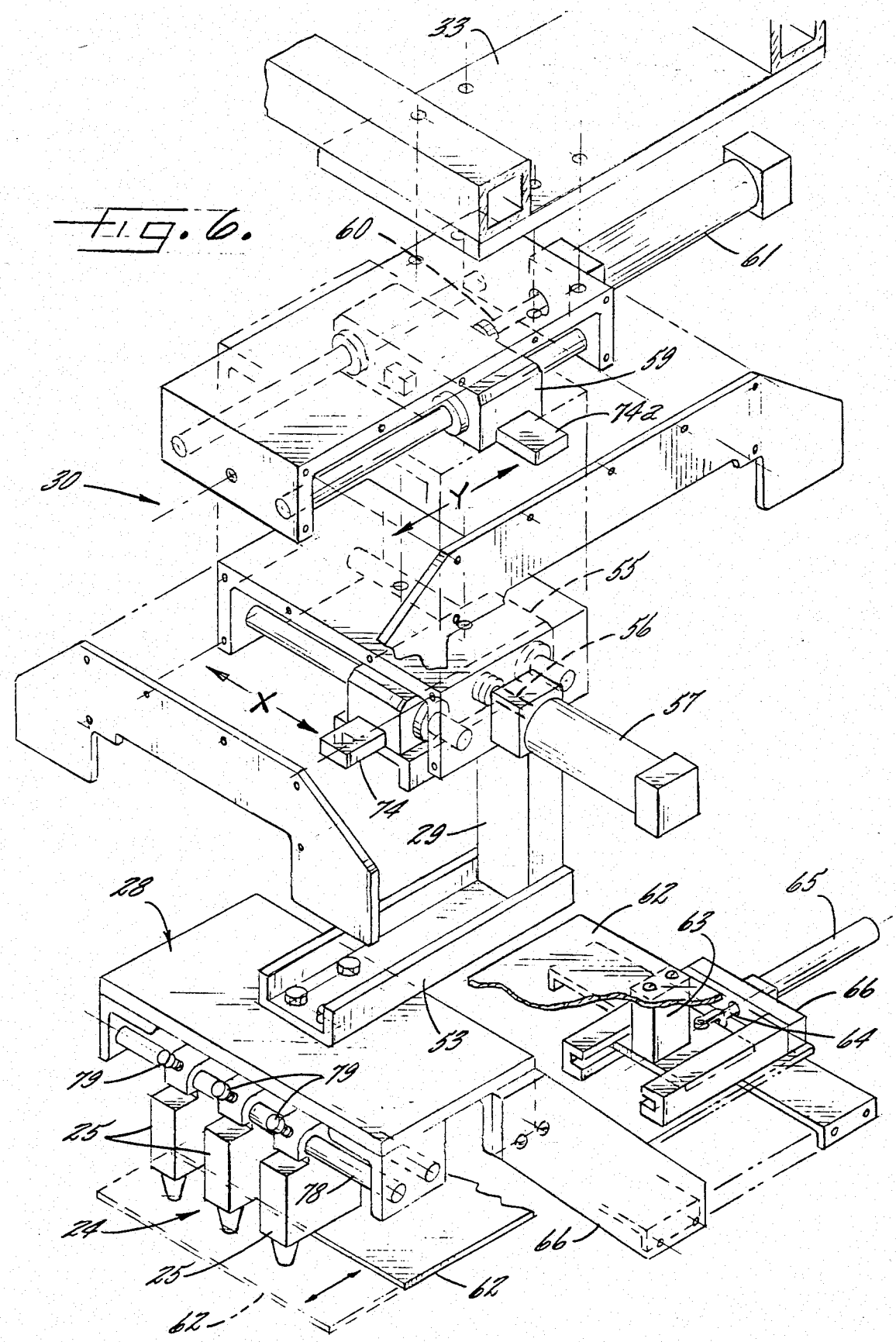
FIG. 6 is a fragmentary exploded view of the dispensing means.

In the exemplary embodiment of the invention as disclosed in the drawing, a container 10 is provided with a bottom wall 11 and a sidewall 12 upstanding therefrom to define an upwardly opening space 13. In the illustrated embodiment, the container comprises a battery case and the space 13 is further divided by a plurality of divider walls 14 forming a plurality of individual sections, or cells, 15 for receiving a corresponding plurality of battery plate assemblies 16. The battery plate assemblies are interconnected suitably at an upper portion thereof through the divider walls 14 and the end cells typically are provided with terminal posts 17 and 18 respectively, extending upwardly through a cover 19 overlying the space 13, as illustrated in FIG. 1.

In the illustrated embodiment, the battery plate assemblies include serpentinely folded insulator sheets 20 insulatingly separating the individual plates 21 of the assembly.

As shown in FIG. 1, the lower end of the assemblies 16 extend into a body 22 of insulating compound provided on the bottom wall 11 in each of the cells 15. The present invention is concerned with the method of and apparatus for providing the compound 22 in the respective cells.

Referring now to FIG. 2, a compound dispensing apparatus 23 is shown to include a dispensing head generally designated 24 having a plurality of nozzles 25. The nozzles are connected by suitable hoses 26 to a supply tank 27 for delivering the insulating compound 22 from the tank downwardly into the upwardly opening cells 15 of a battery case 10 disposed adjacent the dispensing head 24.

As shown in FIG. 2, the nozzles are mounted in side-by-side spaced relationship on a carrier 28 which, in turn, is mounted by a bracket 29 to a transport mechanism generally designated 30. The transport mechanism is arranged to move the dispensing head suitably to fill the different cells 15 of the subjacent battery case 10 by the concurrent delivery of the compound through the respective nozzles 25, as illustrated in FIG. 2.

As further shown, the battery case 10 subjacent the dispensing head 24 is delivered thereto from a supply conveyor 31 feeding the battery cases onto a driven conveyor 32 extending horizontally in front of the frame 33 of the dispenser 23. The battery cases 10 are retained on conveyor 31 for selective delivery to the dispensing position generally designated 34 by a stop 35. A second stop 36 is disposed at the dispensing position to be engaged by the battery case for retaining the battery case in the dispensing position subjacent the dispensing head 24. As shown, stops 35 and 36 are connected by a link 37 through pivot arms 38 and 39, respectively. A suitable air cylinder 40 is mounted to the frame 41 (as shown in FIG. 3) of conveyor 32 for reciprocally pivoting the arms 38 and 39 for selectively disposing the stops upwardly between the conveyor chains 42 (as shown in FIG. 3) to interfere with the movement of the battery cases and downwardly therebelow to permit movement of the battery cases on the conveyor chains.

As shown in FIG. 3, the conveyor frame carries a clamp mechanism 43 having a clamp pad 44 movable against the front side of the battery case for clamping the battery case against a rear pad 45 fixedly mounted to the frame 41 by a bracket 46. Thus, upon the battery case being stopped in its forward movement on the conveyor by the stop 36, it is effectively retained accurately in that dispensing position by the clamping means 43. As shown in FIG. 3, bracket 46 is mounted to a crossbar 47 of frame 41, which further carries suitable guides 48 for guiding the conveyor chains 42.

As further seen in FIG. 3, a sensor 49 is mounted on frame 41 rearwardly of the bracket 46. The bracket is provided with a through opening 50 through which electromagnetic radiation, preferably a photoelectric conversion beam, is directed for sensing a preselected container wall portion 52 when the battery container is in the dispensing position 34 against the stop 36. In the illustrated embodiment, the sensor 49 utilizes a light beam for detecting the preselected container wall portion 52. Such sensors, as well as other sensing means, are well-known in the art and require no further description herein.

As indicated briefly above, nozzles 25 are carried on a transport mechanism 30 for selective disposition relative to the different battery cells 15 and for delivering the compound effectively over the entire area of the bottom wall 11 in the respective cells. Preferably, each pair of filler heads is separated by a distance twice the width of a container section. More specifically, as seen in FIG. 4, nozzle carrier 28 is mounted to a support plate 53 carried on the lower end of a vertical support 29, in turn depending from a mounting block 55. As seen in FIG. 5, the mounting block is carried on a piston rod 56 of an air cylinder 57 so as to be selectively positionable on a carrier bracket 58 parallel to the direction of movement of the chain 42. The carrier bracket 58, in turn, is mounted to a block 59 which, as seen in FIG. 4, is carried on a piston rod 60 of an air cylinder 61 for selective movement perpendicularly to the direction of movement of the chains. In a start position, the three nozzles 25 are aligned respectively with the first, third, and fifth cells relative to the end wall 51 of the battery case, as shown in FIG. 2. In the starting position, the nozzles further are disposed in the retracted position at the sensor side of the cells, as illustrated in FIG. 3, and as illustrated in broken lines in FIG. 4.

To prevent the compound from nozzles 25 dripping onto the partition walls 14 or sidewalls 12 of the battery case during relative horizontal movement, a drip shield 62 is provided. Shield 62 comprises a flat plate carried on a block 63 attached to the piston rod 64 of air cylinder 65 mounted to a bracket 66 in turn carried on the mounting plate 53, as seen in FIG. 4. In the start position, drip plate 62 underlies the nozzles 25, as illustrated in FIG. 3. Initiation of the delivery of the compound to the first, third, and fifth cells from the nozzles, as positioned in FIG. 2, is effected concurrently with the removal of the drip shield plate 62 from subjacent the nozzles, i.e. by a rightward movement of the plate, as seen in FIG. 4, as a result of the rightward movement of the piston rod 64 at this time. Compound is then delivered from the supply tank 27 through the hoses 26 and nozzles 25 into the first, third and fifth cells. During the delivery into these cells, the air cylinder 61 urges the block 59 to the left, as seen in FIG. 4, thereby moving the nozzles from the broken line position to the full line position at the front of the battery case. The resultant layer of compound 22 is illustrated as having been deposited on the bottom wall 11 in FIG. 4.

Upon completion of the delivery of the compound to the first, third and fifth cells, air cylinder 61 moves head 24 back to the rear of the case, as seen in FIG. 3. Drip shield plate 62 is repositioned under the nozzles at this time by the operation of air cylinder 65 bringing the drip shield under the nozzles.

Air cylinder 57 is then energized to reposition the head 24 in alignment with the second, fourth and sixth cells, as seen in FIG. 5. The drip shield is retracted by operation of air cylinder 65 and delivery of the compound through the nozzles into the second, fourth and sixth cells initiated. Air cylinder 61 is energized to extend piston rod 60 to the left, as seen in FIG. 4, thereby moving the nozzles 25 from the broken line position thereof to the full line position while depositing a layer of compound 22 in each of the second, fourth and sixth cells during said movement of the nozzles.

The nozzles are disabled and drip shield 62 is then repositioned under the nozzles, as seen in FIG. 3, and the dispensing head 24 returned to the start position, as shown in FIG. 2.

Thus, the apparatus effects a delivery of the compound to the six cells of the battery by movement of the three nozzles concurrently across the upper end of the first, third and fifth cells and then across the upper end of the second, fourth and sixth cells, with intermittent interposition of the drip shield during the nondelivery times to prevent compound dripping on the side and partition walls 12 and 14, respectively.

In the illustrated embodiment, the insulating and sealing compound 22 comprises a bituminous compound which is heated to provide desired flowability and which then sets about the inserted lower end portions of the battery plate assembly or element 16 to provide the desired seal and insulation between the plates thereof. To maintain the desired temperature of the compound delivered from tank 27, hoses 26 are provided as electrically heated hoses. The compound is delivered to the transfer tank 27 from a main supply tank 86 which, as shown in FIG. 3, may be disposed suitably rearwardly of the apparatus frame 33. The supply tank is provided with a suitable cover assembly 87 carrying a motor-operated supply pump 88 for delivering the compound from the main tank 86 through suitably heated hoses 89. The level of compound in the transfer tank 27 is maintained between upper and lower levels therein by a dual proximity switch generally designated 67. To prevent overfilling of the tank 27 should the proximity switch 67 fail, control of the operation of motor-driven pump 88 is effected so as to limit the running time thereof after initiation of operation. Further, to assure that the compound is delivered to the transfer tank 27 at proper elevated temperature, a temperature sensor 68 is provided in the main tank 86 for controlling operation of the motor-driven pump 88.

As shown in FIG. 3, the end positions in the Y direction movement of dispensing head 24 over the respective cells in filling the cells is sensed by a pair of limit switches 69 and 70 cooperating with control rods 71 and 72 adjustably mounted in block 80, in turn mounted to the block 59 by a mounting bracket 74a, as seen in FIG. 5. The travel of the dispensing head may be suitably and accurately adjusted by stop screw 73, as shown in FIG. 4, for different size battery cases as desired.

As illustrated in FIG. 2, the retracted and extended positions of the dispensing head 24 in the X direction parallel to the travel of chains 42 is sensed by a pair of limit switches 90 and 91, and cooperating rods 75 and 76 adjustably mounted in block 77 which is mounted to mounting bracket 74.

Thus, suitable repositioning of the dispensing head 24 to accommodate different width cells in different size containers may be readily effected as desired by suitable adjustment of stop screw 73a for the X direction and by suitable adjustment of stop screw 73 for the Y direction and spacing between nozzles 25 is adjustably effected by the mounting of the nozzles on rods 78 and suitable lock screws 79, as seen in FIG. 4, being provided for locking the nozzles in position thereon, as desired.

As alternative embodiments, the sequence of the various operations, such as filling the cells, may be varied as well as the mechanical and electrical means for accomplishing the same end. For example, the dispensing head may commence the compound dispensing operation as described and at the end of the first cell filling step, index to the next set of cells and continue the dispensing operation as opposed to returning to the initial position prior to commencing the dispensing operation for the second set of cells as described above. Likewise, all cells may be filled at one time or in any desired sequence or pattern within each cell. Also, hydraulic actuators or other mechanical or electrical actuators may be utilized to accomplish the container positioning and/or filling operation or any selected portion thereof as the versatility of the operation lends itself to a wide variety of different embodiments and configurations.

Further, as used herein, the term "compound" is deemed to include any material which is acid-resistant and which will provide the desired sealing and/or insulating characteristics; such compounds are intended to include epoxies, waxes, and other such compounds in addition to the bituminous compound described herein and may be of either the hot or cold variety or catalytically activated.

Industrial Applicability

Operation of the dispensing apparatus 23 is automatically controlled by a suitable controller generally designated 81, as illustrated in FIG. 7. Illustratively, controller 81 may comprise a conventional microprocessor based programmable controller, such as Gould Modicon Micro 84 Programmable Controller. The controller communicates with the apparatus 23 through suitable input and output modules 82 of conventional construction arranged to convert the incoming voltages from the different sensing devices of the apparatus 23 to signal levels compatible with the controller 81 and the output signals of control 81 to levels compatible with the apparatus 23 in a conventional manner.

Controller 81 functions in a conventional manner to effect the control of the apparatus 23 by a suitable processor portion 84 and a memory portion 85.

Referring to the simplified block diagram of FIG. 8, memory 85 may be provided with the illustrated program for effecting the desired control of the apparatus 23. More specifically, as illustrated in FIG. 8, after the stops 35 and 36 are lowered to permit the battery cases to move therepast toward the right, as seen in FIG. 2, air cylinder 40 is reenergized to move stops 35 and 36 upwardly into the path of the advancing battery cases.

The energization may be effected periodically as determined by a minimum cycle time. The cycle time may, in turn, be indexed with a previous work station (not shown) so that the stops may be moved as a function of the delivery of the battery cases from the previous work station.

Stop 36 moves into stopping disposition, the container engages stop 36, the conveyor movement is stopped and clamping mechanism 43 is energized to cause clamp 44 to position and hold the battery case accurately in the fill position against stops 45 and 36.

At this time, sensing device 49 is enabled to detect whether the held battery case is accurately positioned in the dispensing position 34.

In the event the sensor does detect an accurately aligned container in the dispensing position, the drip shield is retracted by energization of air cylinder 65 and the dispensing nozzles are enabled. The control causes the energization of air cylinder 61 at this time to move the dispensing head forwardly from the start position of FIGS. 2 and 3 over the first, third and fifth cell spaces to dispense the compound onto the bottom portions 11 thereof. At the extended end of the desired travel, as sensed by control switch 70, the dispensing means is disabled upon the expiration of a preset time interval and the dispensing head is retracted to the start position. The drip shield is replaced under the nozzles, and air cylinder 57 is energized to reposition dispensing head 25 in alignment with the second, fourth and sixth cell spaces, as seen in FIG. 5. The drip shield is then retracted by suitable operation of air cylinder 65 and the dispensing head moved forwardly over the second, fourth and sixth cells to dispense compound onto the bottom portions 11 thereof.

When the dispenser head reaches the forward end of the travel as determined by control switch 70, the compound delivery is disabled upon the expiration of a preset time interval and movement back to the retracted position is effected. Air cylinder 65 is operated to bring the drip shield 62 back into disposition under the nozzles and air cylinder 57 is deenergized to bring dispensing head 25 back to the initial start position (as shown in broken lines in FIG. 5) for subsequent repetition of the cycle of operation.

Upon completion of the above discussed cycle, the control causes clamp 44 to retract and stops 35 and 36 to be lowered and the conveyor to be restarted to bring a subsequent battery case into the fill position. When the subsequent battery case is so disposed, sensor 49 senses the presence thereof as discussed above and initiates the next fill cycle.

Further, as illustrated in FIG. 8, in the event no container is brought into position to be sensed by the sensing means 49, the control operates to continue repeatedly to bring battery cases to the fill position by cyclical operation of the stops and conveyor.

The foregoing disclosure of specific embodiments is illustrative of the broad inventive concepts comprehended by the invention.

We claim:

1. A method of controlling a compound dispenser having at least one filler head with an outlet for dispensing compound into a container having relative movement past the dispenser, the container having a plurality of sections separated from each other by partition walls, the container being positioned on conveyor means such that the container and dispenser have relative movement, comprising the steps of:

(a) locating the container in a filling position wherein a first container section is aligned with the filler head;
(b) detecting the position of an accurately aligned container in the filling position adjacent the filler head;
(c) clamping said container to prevent movement thereof from said accurately aligned filling position;
(d) causing the filler head to dispense viscous compound in a first direction from the filler head into said first container section of the clamped container while moving the filler head horizontally relative to the container section from a start position in a second direction transversely of said first direction to dispense a layer of viscous compound onto the bottom thereof;
(e) moving the filler head back to the start position upon completing the dispensing of a layer of compound in the first container section;
(f) moving the filler head into alignment with a second container section; and
(g) causing the filler head to similarly dispense a layer of viscous compound in the second container section.

2. The method of controlling a compound dispenser of claim 1 wherein the filler head is operated for a preselected period of time during which the required amount of compound is dispensed into the container.

3. The method of controlling a compound dispenser of claim 2 including a step of disabling the filler head from dispensing compound upon the expiration of said preselected period of time.

4. The method of controlling a compound dispenser of claim 1 wherein the compound dispenser further includes a tank containing compoound to be supplied to the filler head, said compound defining an upper level in said tank, the method further including the step of monitoring the level of the compound in the tank to maintain the compound level therein, the compound dispenser further including a compound supply means and a pump connected between the supply means and the compound tank, the method further including the step of monitoring the running time of said pump and disabling the pump if the running time exceeds a preset period of time.

5. The method of controlling a compound dispenser of claim 4 further including the step of monitoring the temperature of said compound supply means and stopping the dispensing operation if the temperature falls below a preselected value.

6. The method of controlling a compound dispenser of claim 1 wherein the compound dispenser further includes a tank containing compound to be supplied to the filler head, the method further including the step of monitoring the level of the compound in the tank to maintain the compound level therein.

7. The method of controlling a compound dispenser of claim 1 wherein the compound dispenser includes at least two filler heads and said container includes at least four sections, the method including the step of clamping the container so that each of the filler heads is aligned with a different container section, the filler heads operating at the same time for simultaneously dispensing a layer of compound into a plurality of container sections.

8. The method of controlling a compound dispenser of claim 1 wherein the filler head is moved for a preselected distance while dispensing compound into the container section, said filler head being disabled upon the expiration of the preset dispensing time.

9. The method of controlling a compound dispenser of claim 1 wherein the compound dispenser further include a drip tray extending beneath the filler head to cover an outlet of the head through which compound is dispensed, the method further including the steps of moving the drip tray to uncover the filler head to permit dispensing, and moving the drip tray to cover the filler head outlet prior to repositioning the filler head upon completion of a filling step.

10. The method of controlling a compound dispenser of claim 1 further including the steps of forming a discrete means integrally with the container the position of which is accurately correlated with the disposition of said container section to serve solely as means for locating the container, providing sensing means responsive to electromagnetic radiation reflected from said locating means to provide a signal for use in effecting said causing of said filler head to dispense said compound.

11. The method of controlling a compound dispenser of claim 10 wherein said locating means defines a small external portion of said container.

12. The method of controlling a compound dispenser of claim 10 wherein said container is accurately centered under the nozzle when the locating means is at the desired position.

13. The method of controlling a compound dispenser of claim 10 wherein said sensing means comprises an infrared light beam.

14. The method of controlling a compound dispenser of claim 10 wherein said sensing means comprises a photoelectric conversion beam.

15. The method of controlling a compound dispenser of claim 1 including the steps of
 (e) providing on the container a discrete, small locating means;
 (f) providing a sensor radiation beam capable of being focused and sensing means responsive to reflection of said beam for determining the disposition of said locating means at said focus to provide a signal for controlling delivery of the liquid through said nozzle;
 (g) focusing said sensor radiation beam at a location preselected to locate the container in alignment with said filler head when the locating means is at the focus of said beam; and
 (h) providing clamping means for clamping the container against displacement adjacent said locating means.

16. The method of controlling a compound dispenser of claim 15 wherein said clamping means includes a through opening and said radiation is directed through said opening to said focus location.

17. The method of controlling a compound dispenser of claim 15 wherein said clamping means includes a through opening and said radiation is directed through said opening to said focus location, said opening overlying only a portion of said locating means.

18. The method of controlling a compound dispenser of claim 1 further including the steps of moving the container from said filling position to a cell receiving location remote from said filling position, the compound remaining unset for receiving a cell portion in the unset compound at said cell receiving location and subsequent setting of the compound thereabout remotely of said filling position.

19. The method of controlling a compound dispenser of claim 18 wherein said compound comprises thermoplastic material, and said method includes the step of heating the thermoplastic material to a preselected temperature and depositing the heated material in said receiving space for subsequent insertion of said serpentine edge thereinto.

20. The method of controlling a compound dispenser of claim 18 wherein said compound comprises bituminous insulating material.

21. The method of controlling a compound dispenser of claim 18 wherein said compound comprises bituminous insulating material and said method includes the steps of selectively maintaining a drip shield adjacent the container during and upon completion of the delivery of the bituminous insulating material for preventing dripping of the insulating material onto the container.

22. The method of controlling a compound dispenser of claim 18 wherein said compound is provided to have a depth of approximately $\frac{1}{8}$".

23. The method of controlling a compound dispenser of claim 7 wherein the filler head is moved sequentially along first and second parallel paths during the compound dispensing steps.

24. The method of controlling a compound dispenser of claim 1 wherein the filler head is moved sequentially along first and second parallel oppositely directed paths during the compound dispensing steps.

25. The method of controlling a compound dispenser of claim 1 wherein the filler head is moved sequentially along first and second parallel paths during the compound dispensing steps and dispensing of the compound is interrupted during movement of the filler head from the first to the second path.

26. The method of controlling a compound dispenser of claim 1 including a step of disposing a drip tray under the filler head during movement of the filler head other than while the compound is being dispensed.

27. The method of controlling a compound dispenser of claim 23 including a step of disposing a drip tray under the filler head during movement of the filler head between said paths.

28. Apparatus for dispensing liquid compound into a container having relative movement adjacent a dispensing apparatus, said container including at least four sections, said apparatus comprising:
 at least two filler heads, each having a dispensing outlet;
 means for detecting the presence of a container in a filling position adjacent the filler head;
 means for locating the container in the filling position to prevent movement thereof, each pair of the filler heads being separated by a distance twice the width of a container section, the container being disposed in the filling position with each of the filler heads aligned with container sections spaced apart by an intervening container section;
 means for causing the filler head to dispense compound while moving in a predetermined path relative to said container for dispensing a layer of compound into a first pair of said spaced container sections;
 means for simultaneously repositioning the filler heads upon completing the dispensing of a layer of compound in a first pair of spaced container sections to align the filler heads with a second set of spaced container sections;

means for causing the filler head to dispense compound while moving in a predetermined path relative to said container for dispensing a layer of the compound into a second pair of said spaced container sections; and means for disabling the filler head from dispensing further compound.

29. The apparatus of claim 28 further including a tank containing compound to be supplied to the filler head, and means for monitoring the level of the compound in the tank to maintain the compound level therein.

30. The apparatus of claim 28 further including a compound supply means, a pump connected between the supply means and the compound tank, and means for monitoring the running time of said pump and disabling the pump if the running time exceeds a preset period of time.

31. The apparatus of claim 28 further including means for heating the compound in the supply means, means for monitoring the temperature of the compound in the supply means, and means for stopping the operation in the event the monitored temperature falls below a preset value.

32. Apparatus for dispensing viscous liquid compound into a container having relative movement adjacent a dispensing apparatus, comprising:

at least one filler head with a dispensing outlet positioned in a start position;

a drip tray extending beneath the filler head for catching drip from the outlet of the head;

means for detecting the presence of a container in a filling position subjacent the filler head start position;

means for moving the drip tray from under the filler head outlet;

means for moving the filler head horizontally from the start position and continuing to move the filler head horizontally while causing the filler head to dispense viscous compound downwardly into the container;

means for disabling the filler head from dispensing further compound;

means for moving the filler head upon completion of the dispensing step horizontally back to the start position; and means for returning the drip tray to under the filler head outlet upon disabling the filler head.

33. The apparatus of claim 32 further including means for returning the drip tray under the filler head outlet temporarily during movement of the filler head while concurrently interrupting dispensing of the compound therefrom.

34. The apparatus of claim 32 wherein the container includes a partition wall and further including means for returning the drip tray under the filler head outlet temporarily during movement of the filler head over said partition wall while concurrently interrupting dispensing of the compound therefrom.

35. A method of controlling a compound dispenser having at least one filler head with an outlet for dispensing compound into a container having relative movement past the dispenser, the container having a plurality of sections separated from each other by partition walls, the container being positioned on conveyor means such that the container and dispenser have relative movement, comprising the steps of;

(a) locating the container in a filling position wherein a first container secion is aligned with the filler head;

(b) detecting the position of an accurately aligned container in the filling position adjacent the filler head;

(c) clamping said container to prevent movement thereof from said accurately aligned filling position;

(d) causing the filler head to dispense compound into said first container section of the clamped container while moving the filler head relative to the container section from a start position to dispense a layer of compound onto the bottom thereof;

(e) moving the filler head back to the start position upon completing the dispensing of a layer of a compound in the first section;

(f) moving the filler head into alignment with a second container section; and (g) causing the filler head to similarly dispense a layer of compound in the second container section, said compound dispenser including at least four sections, the method including the step of clamping the container so that each of the filler heads is at least four sections, the method including the step of clamping the container so that each of the filler heads is aligned with a different container section, the filler heads being operated at the same time for simultaneously dispensing a layer of compound into a plurality of container sections, each pair of filler heads being separated by a distance twice the width of a container section, the container being clamped with each of the filler heads aligned with container sections spaced apart by an intervening container section, the method further including simultaneously repositioning the filler heads upon completing a dispensing of a layer of compound to align the filler heads with a second set of spaced container sections.

* * * * *

UNITED STATES PATENT AND TRADEMARK OFFICE
CERTIFICATE OF CORRECTION

PATENT NO. : 4,515,187

DATED : May 7, 1985

INVENTOR(S) : Schaumburg et al.

It is certified that error appears in the above-identified patent and that said Letters Patent is hereby corrected as shown below:

Claim 23, line 2, change "7" to -- 1 --

Signed and Sealed this

Seventeenth Day of May, 1988

Attest:

DONALD J. QUIGG

*Attesting Officer*  *Commissioner of Patents and Trademarks*